(12) United States Patent
Yamada (10) Patent No.: US 12,162,163 B2
(45) Date of Patent: Dec. 10, 2024

(54) ROBOT MONITORING APPARATUS AND ROBOT SYSTEM

(71) Applicant: Seiko Epson Corporation, Tokyo (JP)

(72) Inventor: Yoshihito Yamada, Chino (JP)

(73) Assignee: SEIKO EPSON CORPORATION (JP)

( * ) Notice: Subject to any disclaimer, the term of this patent is extended or adjusted under 35 U.S.C. 154(b) by 344 days.

(21) Appl. No.: 17/672,756

(22) Filed: Feb. 16, 2022

(65) Prior Publication Data

US 2022/0258350 A1 Aug. 18, 2022

(30) Foreign Application Priority Data

Feb. 17, 2021 (JP) ................. 2021-023088

(51) Int. Cl.
*B25J 9/16* (2006.01)
*B25J 13/08* (2006.01)

(52) U.S. Cl.
CPC .......... *B25J 9/1676* (2013.01); *B25J 9/1653* (2013.01); *B25J 9/1666* (2013.01); *B25J 13/088* (2013.01)

(58) Field of Classification Search
CPC ...... B25J 13/088; B25J 9/1653; B25J 9/1666; B25J 9/1676; G05B 2219/40203
See application file for complete search history.

(56) References Cited

U.S. PATENT DOCUMENTS

| | | | | |
|---|---|---|---|---|
| 9,694,497 B2* | 7/2017 | Burmeister | ............ | B25J 9/1666 |
| 10,016,894 B2* | 7/2018 | Hietmann | .............. | B25J 9/1674 |
| 10,152,043 B2* | 12/2018 | Naitou | ................... | B25J 9/1676 |
| 10,220,514 B2* | 3/2019 | Tronnier | ................ | B25J 9/1676 |
| 2004/0249508 A1 | 12/2004 | Suita et al. | | |
| 2011/0264266 A1* | 10/2011 | Kock | ..................... | B25J 9/1676 700/255 |
| 2016/0016313 A1 | 1/2016 | Oyama et al. | | |
| 2017/0261962 A1* | 9/2017 | Naitou | .................. | B25J 9/1676 |

(Continued)

FOREIGN PATENT DOCUMENTS

| | | |
|---|---|---|
| CN | 107175658 A | 9/2017 |
| JP | S60-054002 A | 3/1985 |

(Continued)

*Primary Examiner* — Adam R Mott
*Assistant Examiner* — James Miller Watts, III
(74) *Attorney, Agent, or Firm* — Harness, Dickey & Pierce, P.L.C.

(57) ABSTRACT

A robot monitoring apparatus includes a position monitoring unit having a position monitoring function of calculating an attitude of a robot, and monitoring whether or not the robot interferes with a virtual safety fence, and a speed monitoring unit having a speed monitoring function of calculating and monitoring a speed of the robot. The apparatus has a first monitor mode in which, when the robot moves in an automatic operation mode, the robot is stopped when the robot interferes with the virtual safety fence in the position monitoring function and when the speed of the robot exceeds a first upper limit value in the speed monitoring function, and a second monitor mode in which, when the robot moves in a manual operation mode, the position monitoring function is disabled and the robot is stopped when the speed of the robot exceeds a second upper limit value smaller than the first upper limit value in the speed monitoring function.

7 Claims, 5 Drawing Sheets

(56) References Cited

U.S. PATENT DOCUMENTS

2021/0053227 A1\* 2/2021 Wartenberg .............. B25J 19/06
2022/0379468 A1\* 12/2022 Hansen .................. B25J 13/088
2024/0066702 A1\* 2/2024 Norrlöf .................. B25J 9/1664

FOREIGN PATENT DOCUMENTS

| JP | H07-237174 A | | 9/1995 | | |
|----|--------------|---|--------|---|---|
| JP | 2004-322244 A | | 11/2004 | | |
| WO | WO-2014048443 A1 | \* | 4/2014 | ............ | B25J 9/1666 |
| WO | WO-2019025253 A1 | \* | 2/2019 | ............ | B25J 9/1666 |

\* cited by examiner

| STATUSES BY INPUT OF VARIOUS SIGNALS | | |
|---|---|---|
| EMERGENCY STOP SIGNAL | ENABLED | |
| OPERATION MODE SIGNAL | CONTINUOUS OPERATION MODE | MANUAL OPERATION MODE |
| ENABLE SWITCH SIGNAL | DISABLED | ENABLED |
| SAFETY INPUT SIGNAL | ENABLED | DISABLED |
| STATUSES OF VARIOUS FUNCTIONS | | |
| SAFETY FUNCTION SWITCHED BETWEEN ENABLED AND DISABLED BY SAFETY INPUT SIGNAL | POSITION MONITORING BY VIRTUAL SAFETY FENCE | ENABLED | DISABLED |
| | SPEED MONITORING | FIRST UPPER LIMIT VALUE V1 | SECOND UPPER LIMIT VALUE V2 |

ROBOT MONITORING APPARATUS AND ROBOT SYSTEM

The present application is based on, and claims priority from JP Application Serial Number 2021-023088, filed Feb. 17, 2021, the disclosure of which is hereby incorporated by reference herein in its entirety.

BACKGROUND

1. Technical Field

The present disclosure relates to a robot monitoring apparatus and a robot system.

2. Related Art

JP-A-2004-322244 discloses a technique of controlling motion of a robot using a virtual safety fence. In this technique, the virtual safety fence is defined on a memory and two or more three-dimensional space regions containing parts of the robot are defined. Predicted positions of the defined three-dimensional space regions are checked against the virtual safety fence and, when the predicted position of one of the defined three-dimensional space regions is within the virtual safety fence, control to stop the movement of a robot arm is performed.

However, in the above described related art, there is a problem that, when the robot stops because the predicted position of the robot is within the virtual safety fence, the procedure to return the robot in the operative state is complex. That is, after the robot stops, it is necessary to specify the virtual safety fence containing the predicted position of the robot, perform operation to disable the specified virtual safety fence, and move the robot to a position where the predicted position of the robot is not within virtual safety fence. There is a problem that the procedure is complex and may not be easily executed.

SUMMARY

According to a first aspect of the present disclosure, a robot monitoring apparatus monitoring a robot is provided. The robot monitoring apparatus includes a position monitoring unit having a position monitoring function of calculating an attitude of the robot from encoder values provided from encoders provided in respective joints of the robot, and monitoring whether or not the robot interferes with a virtual safety fence, and a speed monitoring unit having a speed monitoring function of calculating a speed of the robot from the encoder values, and monitoring whether or not the speed of the robot exceeds an upper limit value. The robot monitoring apparatus has a first monitor mode in which, when the robot moves in an automatic operation mode, the robot is stopped when the robot interferes with the virtual safety fence in the position monitoring function and when the speed of the robot exceeds a first upper limit value in the speed monitoring function, and a second monitor mode in which, when the robot moves in a manual operation mode, the position monitoring function is disabled and the robot is stopped when the speed of the robot exceeds a second upper limit value smaller than the first upper limit value in the speed monitoring function.

According to a second aspect of the present disclosure, a robot system including a robot, a control apparatus controlling the robot, and a robot monitoring apparatus monitoring the robot is provided. The robot monitoring apparatus includes a position monitoring unit having a position monitoring function of calculating an attitude of the robot from encoder values provided from encoders provided in respective joints of the robot, and monitoring whether or not the robot interferes with a virtual safety fence, and a speed monitoring unit having a speed monitoring function of calculating a speed of the robot from the encoder values, and monitoring whether or not the speed of the robot exceeds an upper limit value. The robot monitoring apparatus has a first monitor mode in which, when the robot moves in an automatic operation mode, the robot is stopped when the robot interferes with the virtual safety fence in the position monitoring function and when the speed of the robot exceeds a first upper limit value in the speed monitoring function, and a second monitor mode in which, when the robot moves in a manual operation mode, the position monitoring function is disabled and the robot is stopped when the speed of the robot exceeds a second upper limit value smaller than the first upper limit value in the speed monitoring function.

DESCRIPTION OF EXEMPLARY EMBODIMENTS

Figure 1:
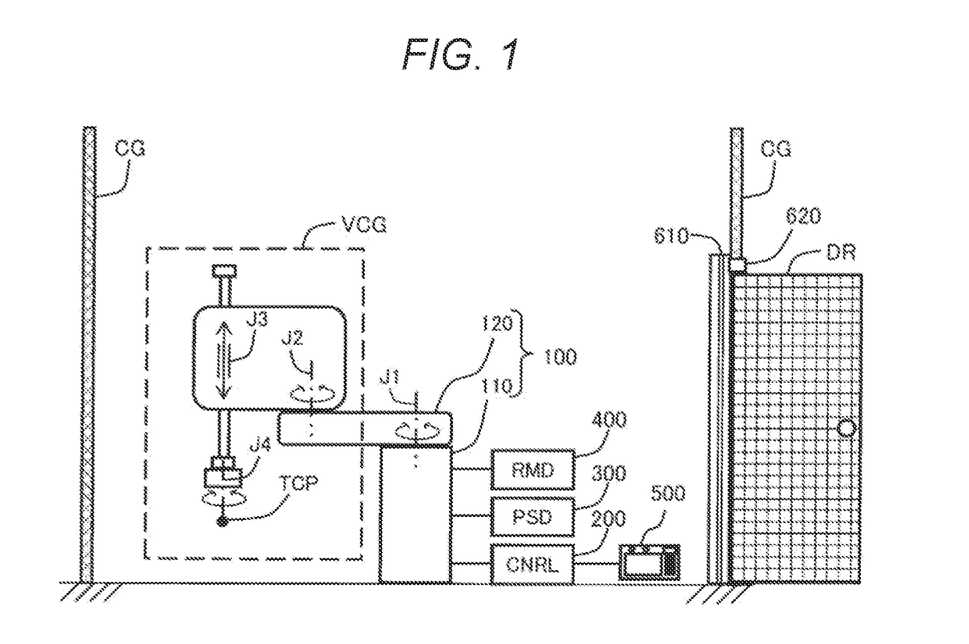
FIG. 1 is an explanatory diagram of a configuration example of a robot system.

FIG. 1 is an explanatory diagram showing an example of a robot system. The robot system includes a robot 100, a control apparatus 200, a power shut-off apparatus 300, and a robot monitoring apparatus 400. When teaching of the robot 100 is performed, a teaching pendant 500 can be coupled to the control apparatus 200. In the example of FIG. 1, the robot monitoring apparatus 400 is drawn separately from the control apparatus 200, however, the robot monitoring apparatus 400 may be mounted as an extension board inserted into the same housing as the control apparatus 200.

The robot 100 includes a base 110 and a robot arm 120. The robot arm 120 is sequentially coupled by four joints J1 to J4. A TCP (Tool Center Point) as a control point of the robot 100 is set near the distal end portion of the robot arm 120. "Control point" refers to a point as a reference for control of the robot arm 120. The TCP can be set in an arbitrary position. The control of the robot 100 is control of a position and an attitude of the TCP. In the embodiment, a four-axis robot in which the robot arm 120 has the four joints J1 to J4 is exemplified, however, a robot having an arbitrary arm mechanism having one or more joints can be used. The robot 100 of the embodiment is a horizontal articulated robot, however, a vertical articulated robot may be used.

The work area of the robot 100 is surrounded by a safety fence CG. A safety door DR through which a human can enter and exit is provided in the safety fence CG. In the robot system, a light curtain 610 and a safety door sensor 620 are provided as sensors. The light curtain 610 is an optical sensor that detects an object passing through the safety door DR. The safety door sensor 620 is an opening and closing sensor that detects opening and closing states of the safety door DR. The sensors can be omitted.

A virtual safety fence VCG is set around the robot arm 120. The virtual safety fence VCG does not really exist, but is a virtual object defined on the memory of the robot monitoring apparatus 400. The virtual safety fence VCG is set in advance in consideration of the environment and the details of work of the robot 100. On the other hand, the safety fence CG is a real object placed in a real three-dimensional space. The virtual safety fence VCG is set inside of the safety fence CG. Note that the safety fence CG may be omitted.

Figure 2:
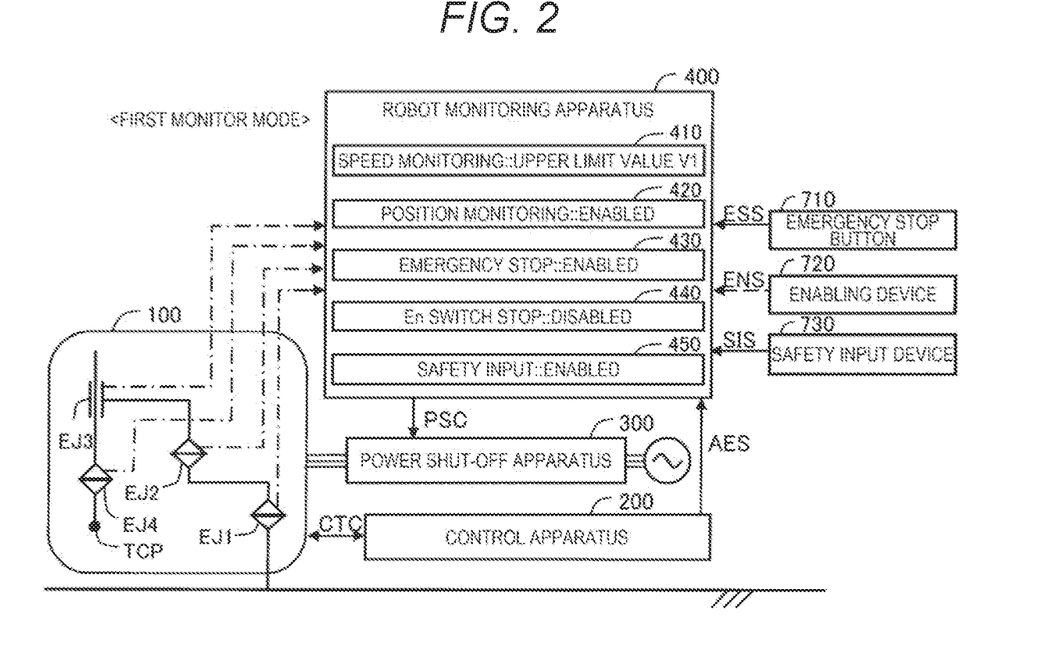
FIG. 2 is a block diagram showing functions of a robot monitoring apparatus in an automatic operation mode.

FIG. 2 is a block diagram showing functions of the robot monitoring apparatus 400. As will be described later, the robot monitoring apparatus 400 has a first monitor mode when the robot 100 moves in an automatic operation mode and a second monitor mode when the robot 100 moves in a manual operation mode. FIG. 2 shows a state of the first monitor mode when the robot 100 moves in the automatic operation mode. In the automatic operation mode, the control apparatus 200 gives a control command CTC to the robot 100 to move according to a control program stored in the control apparatus 200. Therefore, in the automatic operation mode, the robot 100 automatically moves without receiving an instruction from a user during the motion. Further, in the automatic operation mode, an automatic operation mode enabling signal AES is input from the control apparatus 200 to the robot monitoring apparatus 400, and the robot monitoring apparatus 400 executes monitoring of the robot 100 in a mode suitable for the automatic operation mode in response to the signal.

The robot monitoring apparatus 400 has a speed monitoring unit 410, a position monitoring unit 420, an emergency stop monitoring unit 430, and an enable switch signal monitoring unit 440, and an safety input signal monitoring unit 450.

The speed monitoring unit 410 has a speed monitoring function of calculating a speed of the robot 100 from encoder values provided from encoders EJ1 to EJ4 provided in the respective joints of the robot 100 and monitoring whether or not the speed of the robot 100 exceeds an upper limit value. In the present disclosure, "speed of robot" refers to a speed of the TCP as the control point of the robot 100.

The position monitoring unit 420 has a position monitoring function of calculating an attitude of the robot 100 from the encoder values provided from encoders EJ1 to EJ4 and monitoring whether or not the robot 100 interferes with the virtual safety fence VCG. In the present disclosure, "attitude of robot" refers to three-dimensional position and attitude of the whole robot arm 120. Therefore, the position monitoring unit 420 monitors whether or not some part of the robot arm 120 does not overlap with the virtual safety fence VCG. In the following explanation, the speed monitoring function and the position monitoring function are also collectively referred to as "safety function".

The emergency stop monitoring unit 430 has a function of monitoring whether or not an emergency stop signal ESS is input from an emergency stop button 710. When the emergency stop signal ESS is input, the emergency stop monitoring unit 430 provides a power shut-off command PSC to the power shut-off apparatus 300 to shut off power supply to the robot 100.

The enable switch signal monitoring unit 440 has a function of monitoring whether an enable switch signal ENS input from an enabling device 720 is on or off. The enable switch signal monitoring unit 440 permits a motion of the robot 100 when the enable switch signal ENS is on and, when the enable switch signal ENS is switched to off, stops the robot 100. The operation of the enabling device 720 is performed by the user. The monitoring function by the enable switch signal monitoring unit 440 is not used in the automatic operation mode, but used in the manual operation mode.

The safety input signal monitoring unit 450 has a function of monitoring whether or not a safety input signal SIS is input from a safety input device 730. As the safety input device 730, for example, the light curtain 610 and the safety door sensor 620 shown in FIG. 1 can be used. If the safety input signal SIS is input when the robot 100 moves in the automatic operation mode, the safety input signal monitoring unit 450 switches the position monitoring function and the speed monitoring function as the safety function from disabled to enabled. For example, when a human enters into the safety fence CG, the safety input signal SIS is input to the robot monitoring apparatus 400 and the safety function is switched from disabled to enabled. As a result, the robot monitoring apparatus 400 starts monitoring of the robot 100 in the first monitor mode shown in FIG. 2. When the safety input signal SIS is once input, the input state of the safety input signal SIS is maintained, that is, the enabled state of the safety function is maintained until the state is reset by the user. Note that the safety function may be constantly enabled in the automatic operation mode without switching of the safety function by the safety input signal SIS.

The above described various functions of the robot monitoring apparatus 400 may be realized by the processor of the robot monitoring apparatus 400 executing the computer program stored in the memory of the robot monitoring apparatus 400. Or, part or all of the functions of the robot monitoring apparatus 400 may be realized by a hardware circuit.

As shown in FIG. 2, in the first monitor mode for the automatic operation mode, the functions of the respective units of the robot monitoring apparatus 400 are in the following statuses.

(1) The speed monitoring function of the speed monitoring unit 410 is enabled and the speed monitoring is executed with a first upper limit value V1.

(2) The position monitoring function of the position monitoring unit 420 is enabled.

(3) The monitoring function of the emergency stop monitoring unit 430 is enabled.

(4) The monitoring function of the enable switch signal monitoring unit 440 is disabled.

(5) The monitoring function of the safety input signal monitoring unit 450 is enabled.

Figure 3:
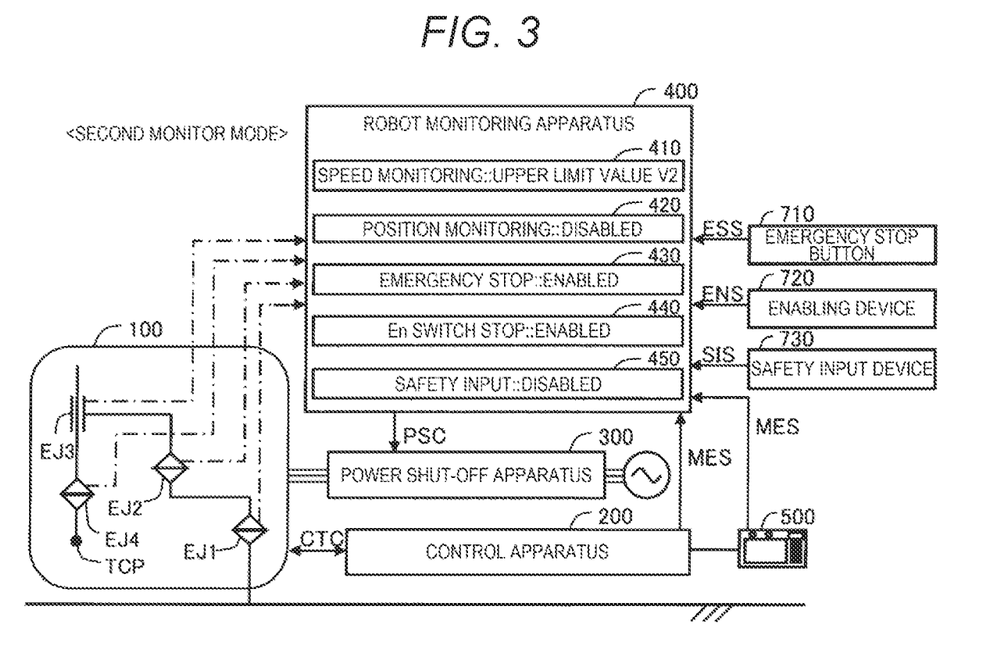
FIG. 3 is a block diagram showing functions of a robot monitoring apparatus in a manual operation mode.

FIG. 3 shows a state of the second monitor mode when the robot 100 moves in the manual operation mode. In the manual operation mode, the user manually operates the robot 100 using the teaching pendant 500 or an operation unit of the control apparatus 200. Further, in the manual operation mode, a manual operation mode enabling signal MES is input from the teaching pendant 500 or the control apparatus 200 to the robot monitoring apparatus 400 according to the instruction by the user, and the robot monitoring apparatus 400 executes monitoring of the robot 100 in the second monitor mode in response to the signal. In this manner, switching from the first monitor mode to the second monitor mode is performed in conjunction with the switching from the automatic operation mode to the manual operation mode according to the instruction by the user. Therefore, the operation mode may be switched from the first monitor mode for the automatic operation mode to the second monitor mode for the manual operation mode according to the instruction by the user.

In the second monitor mode shown in FIG. 3, the functions of the respective units of the robot monitoring apparatus 400 are in the following statuses.

(1) The speed monitoring function of the speed monitoring unit 410 is enabled and the speed monitoring is executed with a second upper limit value V2 smaller than the first upper limit value V1. The second upper limit value V2 may be set to e.g. a value equal to the manually reduced speed specified in the safety standards for industrial robots. Specifically, in ISO 10218 as safety standards for industrial robots, the manually reduced speed as the upper limit speed in the manual mode is defined as 250 mm/sec, and the second upper limit value V2 may be set to 250 mm/sec. By the setting, the robot 100 may be moved at the sufficiently low speed. It is preferable to set the second upper limit value V2 to a value smaller than the manually reduced speed specified in the safety standards for industrial robots. By the setting, the robot 100 may be moved at the lower speed. The first upper limit value V1 in the automatic operation mode may be set to an arbitrary value larger than the second upper limit value V2 according to the performance and the details of work of the robot 100.

(2) The position monitoring function of the position monitoring unit 420 is disabled. Accordingly, the user may move the robot 100 without considering whether or not the robot 100 interferes with the virtual safety fence VCG.

(3) The monitoring function of the emergency stop monitoring unit 430 is enabled.

(4) The monitoring function of the enable switch signal monitoring unit 440 is enabled.

(5) The monitoring function of the safety input signal monitoring unit 450 is disabled.

As described above, in the second monitor mode for the manual operation mode, the speed of the robot 100 is restricted to the second upper limit value V2 or less, and the robot 100 moves only slowly. Therefore, when the robot 100 nearly interferes with another object, the user may stop the robot 100 using the enabling device 720 or the emergency stop button 710. As a result, an operation to move the robot 100 to an attitude not overlapping with the virtual safety fence VCG and make the robot 100 movable in the automatic operation mode again may be easily executed without an interference with the other object. Further, in the second monitor mode, the robot 100 can be operated regardless of whether or not the safety input signal SIS is input without regard to the virtual safety fence VCG set by the robot monitoring apparatus 400.

Note that it is preferable that the user selects the manual operation mode after the robot 100 interferes with the virtual safety fence VCG and stops in the automatic operation mode. In the second monitor mode for the manual operation mode, the position monitoring function is disabled, and an operation to manually move the robot 100 to an attitude not interfering with the virtual safety fence VCG and make the robot 100 automatically movable again may be easily executed.

Figure 4:
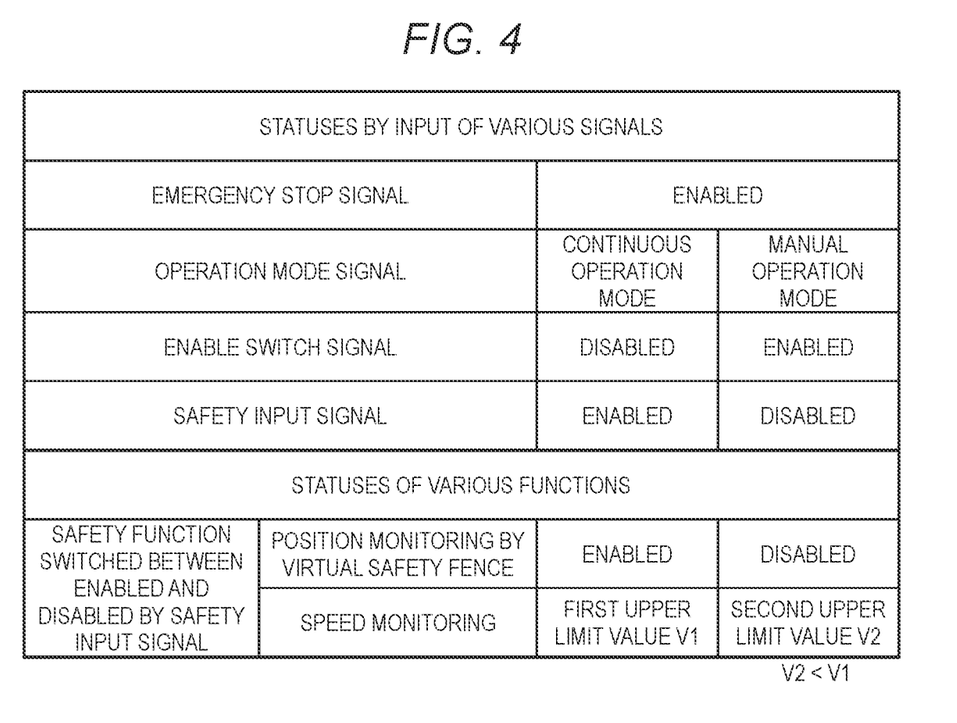
FIG. 4 is an explanatory diagram showing various statuses in the automatic operation mode and the manual operation mode.

FIG. 4 is an explanatory diagram showing various statuses in the automatic operation mode and the manual operation mode. In the automatic operation mode, the monitoring function of the safety input signal monitoring unit 450 is enabled and, when the safety input signal is input to the robot monitoring apparatus 400, the position monitoring function and the speed monitoring function as the safety function are switched from disabled to enabled in response to the signal. On the other hand, in the manual operation mode, the monitoring function of the safety input signal monitoring unit 450 is disabled, and the position monitoring function is disabled and the speed monitoring function using the second upper limit value V2 is enabled regardless of whether or not the safety input signal is input. In other words, in the manual operation mode, the motion of the robot 100 may be monitored in the second monitor mode regardless of whether or not the safety input signal is input.

Figure 5:
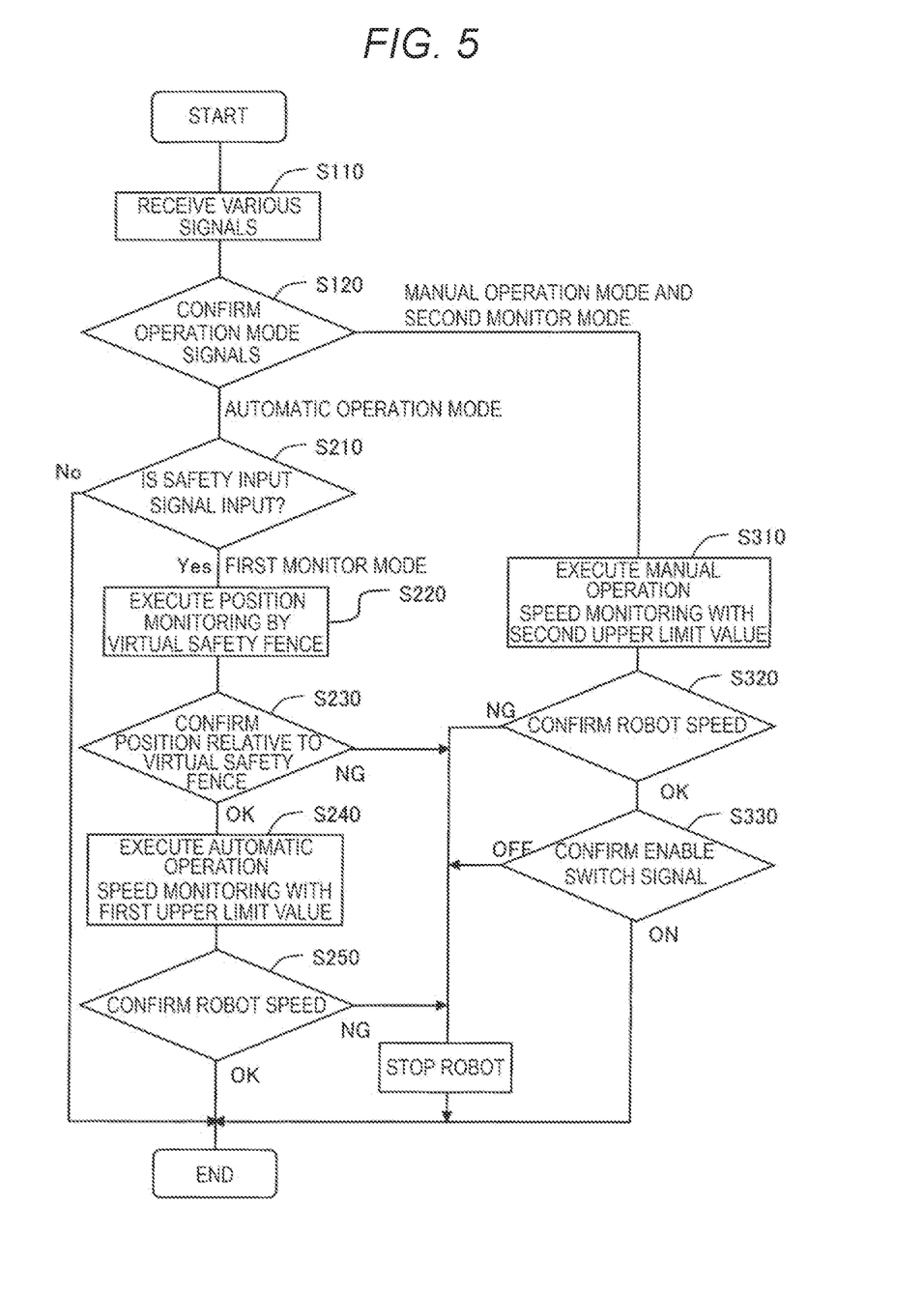
FIG. 5 is a flowchart showing a monitoring procedure of a robot by the robot monitoring apparatus.

FIG. 5 is a flowchart showing a monitoring procedure of the robot 100 by the robot monitoring apparatus 400. The monitoring procedure is repeatedly executed on a regular basis by the robot monitoring apparatus 400.

At step S110, the robot monitoring apparatus 400 receives various signals shown in FIGS. 2 and 3. At step S120, whether the operation mode signal is the automatic operation mode enabling signal AES or the manual operation mode enabling signal MES is determined. When the operation mode signal is the automatic operation mode enabling signal AES, the automatic operation mode at step S210 and subsequent steps is executed. On the other hand, when the operation mode signal is the manual operation mode enabling signal MES, the manual operation mode at step S310 and subsequent steps is executed.

In the automatic operation mode, at step S210, whether or not the safety input signal SIS is input is confirmed. When the safety input signal SIS is not input, the position monitoring function and the speed monitoring function as the safety function are kept disabled, the processing in FIG. 5 is ended, and the motion of the robot 100 in the automatic operation mode is continued. On the other hand, when the safety input signal SIS is input, the safety function is switched from disabled to enabled, and the processing at steps S220 to S250 is executed according to the first monitor mode. At steps S220, S230, the position monitoring using the virtual safety fence VCG is executed and, when the attitude of the robot 100 interferes with the virtual safety fence VCG, the robot 100 is stopped. At steps S240, S250, the motion of the robot 100 in the automatic operation mode is continued, the speed monitoring using the first upper limit value V1 is performed, and, when the speed of the robot 100 exceeds the first upper limit value V1, the robot 100 is stopped.

In the manual operation mode, steps S310 to S330 are executed according to the second monitor mode. At steps S310, S320, the speed monitoring using the second upper limit value V2 is performed while the user moves the robot 100 in the manual operation mode and, when the speed of the robot 100 exceeds the second upper limit value V2, the robot 100 is stopped. At step S330, the enable switch signal ENS is confirmed and, when the enable switch signal ENS is turned off, the robot 100 is stopped. As understood from the procedure in FIG. 5, when the user switches from the automatic operation mode to the manual operation mode while the robot monitoring apparatus 400 monitors in the first monitor mode, the monitor mode is switched from the first monitor mode to the second monitor mode. In other words, switching from the first monitor mode to the second monitor mode is performed in conjunction with the switching from the automatic operation mode to the manual operation mode according to the instruction by the user.

As described above, in the embodiment, in the manual operation mode, the position monitoring function using the virtual safety fence VCG is disabled and the upper limit value in the speed monitoring function is set to be the smaller value than that in the automatic operation mode, and thereby, the operation to move the robot 100 to the attitude not interfering with the virtual safety fence VCG may be easily executed without an interference with another object.

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined to solve part or all of the problems of the present disclosure or achieve part or all of the effects of the present disclosure. The technical features not described as essential features in this specification can be appropriately deleted.

(1) According to a first aspect of the present disclosure, a robot monitoring apparatus monitoring a robot is provided. The robot monitoring apparatus includes a position monitoring unit having a position monitoring function of calculating an attitude of the robot from encoder values provided from encoders provided in respective joints of the robot, and monitoring whether or not the robot interferes with a virtual safety fence, and a speed monitoring unit having a speed monitoring function of calculating a speed of the robot from the encoder values, and monitoring whether or not the speed of the robot exceeds an upper limit value. The robot monitoring apparatus has a first monitor mode in which, when the robot moves in an automatic operation mode, the robot is stopped when the robot interferes with the virtual safety fence in the position monitoring function and when the speed of the robot exceeds a first upper limit value in the speed monitoring function, and a second monitor mode in which, when the robot moves in a manual operation mode, the position monitoring function is disabled and the robot is stopped when the speed of the robot exceeds a second upper limit value smaller than the first upper limit value in the speed monitoring function.

According to the robot monitoring apparatus, in the manual operation mode, the position monitoring function using the virtual safety fence is disabled and the upper limit value in the speed monitoring function is set to be the smaller value than that in the automatic operation mode, and thereby, the operation to move the robot to the attitude not interfering with the virtual safety fence may be easily executed without an interference with another object.

(2) In the robot monitoring apparatus, in the automatic operation mode, when a safety input signal for switching the position monitoring function and the speed monitoring function between enabled and disabled is input to the robot monitoring apparatus, the position monitoring function and the speed monitoring function may be switched from disabled to enabled and monitoring of the robot in the first monitor mode may be executed, and, in the manual operation mode, monitoring of the robot in the second monitor mode may be executed regardless of whether or not the safety input signal is input to the robot monitoring apparatus.

According to the robot monitoring apparatus, in the manual operation mode, the motion of the robot may be monitored in the second monitor mode regardless of whether or not the safety input signal is input.

(3) In the robot monitoring apparatus, switching from the first monitor mode to the second monitor mode may be performed in conjunction with switching from the automatic operation mode to the manual operation mode according to an instruction by a user.

According to the robot monitoring apparatus, the operation mode may be switched from the first monitor mode for the automatic operation mode to the second monitor mode for the manual operation mode according to the instruction by the user.

(4) In the robot monitoring apparatus, the manual operation mode may be selectable after the robot interferes with the virtual safety fence and stops in the automatic operation mode.

According to the robot monitoring apparatus, an operation to move the robot to an attitude not interfering with the virtual safety fence using the manual operation mode and make the robot movable again may be easily executed after the robot interferes with the virtual safety fence and stops in the automatic operation mode.

(5) In the robot monitoring apparatus, the second upper limit value may be a manually reduced speed specified in safety standards for industrial robots.

According to the robot monitoring apparatus, the robot may be moved at a sufficiently low speed.

(6) In the robot monitoring apparatus, the second upper limit value may be a value smaller than a manually reduced speed specified in safety standards for industrial robots.

According to the robot monitoring apparatus, the robot may be moved at a lower speed.

(7) According to a second aspect of the present disclosure, a robot system including a robot, a control apparatus controlling the robot, and a robot monitoring apparatus monitoring the robot is provided. The robot monitoring apparatus includes a position monitoring unit having a position monitoring function of calculating an attitude of the robot from encoder values provided from encoders provided in respective joints of the robot, and monitoring whether or not the robot interferes with a virtual safety fence, and a speed monitoring unit having a speed monitoring function of calculating a speed of the robot from the encoder values, and monitoring whether or not the speed of the robot exceeds an upper limit value. The robot monitoring apparatus has a first monitor mode in which, when the robot moves in an automatic operation mode, the robot is stopped when the robot interferes with the virtual safety fence in the position monitoring function and when the speed of the robot exceeds a first upper limit value in the speed monitoring function, and a second monitor mode in which, when the robot moves in a manual operation mode, the position monitoring function is disabled and the robot is stopped when the speed of the robot exceeds a second upper limit value smaller than the first upper limit value in the speed monitoring function.

According to the robot system, in the manual operation mode, the position monitoring function using the virtual safety fence is disabled and the upper limit value in the speed monitoring function is set to be the smaller value than that in the automatic operation mode, and thereby, the operation to move the robot to the attitude not interfering with the virtual safety fence may be easily executed without an interference with another object.

What is claimed is:

1. A robot monitoring apparatus monitoring a robot, comprising:
a memory configured to store a program;
a processor configured to execute the program so as to:

receive encoder values from encoders provided in
respective joints of the robot;
select between a safety signal monitoring enabled state
and a safety signal monitoring disabled state,
wherein:
when the safety signal monitoring enabled state is
selected, the processor enables monitoring
whether a safety input signal is received, and the
processor receives the safety input signal when an
operator of the robot enters inside a physical
safety fence; and
when the safety signal monitoring disabled state is
selected, the processor disables the monitoring;
calculate an attitude of the robot based on the encoder
values and monitor, as a position monitoring function, whether or not the robot interferes with a virtual
safety fence that is provided inside the physical
safety fence; and
calculate a speed of the robot based on the encoder
values and monitor, as a speed monitoring function,
whether or not the speed of the robot exceeds an
upper limit value,
wherein the robot monitoring apparatus having has:
a first monitor mode in which, when the robot moves in
an automatic operation mode, the robot is stopped
when the robot interferes with the virtual safety
fence in the position monitoring function and when
the speed of the robot exceeds a first upper limit
value in the speed monitoring function; and
a second monitor mode in which, when the robot moves
in a manual operation mode, the position monitoring
function is disabled and the robot is stopped when
the speed of the robot exceeds a second upper limit
value smaller than the first upper limit value in the
speed monitoring function,
when the processor receives the safety input signal in the
safety signal monitoring enabled state, the first monitor
mode is enabled, and
when the safety signal monitoring disabled state is
selected, the second monitor mode is enabled.

2. The robot monitoring apparatus according to claim 1,
wherein
in the automatic operation mode, when the safety input
signal for switching the position monitoring function
and the speed monitoring function between enabled and
disabled is input to the robot monitoring apparatus, the
position monitoring function and the speed monitoring
function are switched from disabled to enabled and
monitoring of the robot in the first monitor mode is
executed, and
in the manual operation mode, monitoring of the robot in
the second monitor mode is executed regardless of
whether or not the safety input signal is input to the
robot monitoring apparatus.

3. The robot monitoring apparatus according to claim 1,
wherein
switching from the first monitor mode to the second
monitor mode is performed in conjunction with switching from the automatic operation mode to the manual
operation mode according to an instruction by the
operator.

4. The robot monitoring apparatus according to claim 3,
wherein
the manual operation mode is selectable after the robot
interferes with the virtual safety fence and stops in the
automatic operation mode.

5. The robot monitoring apparatus according to claim 1,
wherein
the second upper limit value is a manually reduced speed
specified in safety standards for industrial robots.

6. The robot monitoring apparatus according to claim 1,
wherein
the second upper limit value is a value smaller than a
manually reduced speed specified in safety standards
for industrial robots.

7. A robot system comprising:
a robot; and
a robot monitoring apparatus monitoring the robot, the
robot monitoring apparatus including:
a memory configured to store a program;
a processor configured to execute the program so as to:
receive encoder values from encoders provided in
respective joints of the robot;
select between a safety signal monitoring enabled
state and a safety signal monitoring disabled state,
wherein:
when the safety signal monitoring enabled state is
selected, the processor enables monitoring
whether a safety input signal is received, and
the processor receives the safety input signal
when an operator of the robot enters inside a
physical safety fence; and
when the safety signal monitoring disabled state is
selected, the processor disables the monitoring;
calculate an attitude of the robot based on the
encoder values and monitor, as a position monitoring function, whether or not the robot interferes
with a virtual safety fence that is provided inside
the physical safety fence; and
calculate a speed of the robot based on the encoder
values and monitor, as a speed monitoring function, whether or not the speed of the robot exceeds
an upper limit value,
wherein the robot monitoring apparatus has:
a first monitor mode in which, when the robot moves in
an automatic operation mode, the robot is stopped
when the robot interferes with the virtual safety
fence in the position monitoring function and when
the speed of the robot exceeds a first upper limit
value in the speed monitoring function; and
a second monitor mode in which, when the robot moves
in a manual operation mode, the position monitoring
function is disabled and the robot is stopped when
the speed of the robot exceeds a second upper limit
value smaller than the first upper limit value in the
speed monitoring function,
when the processor receives the safety input signal in the
safety signal monitoring enabled state, the first monitor
mode is enabled, and
when the safety signal monitoring disabled state is
selected, the second monitor mode is enabled.

* * * * *